United States Patent [19]

Burns

[11] Patent Number: 4,928,284
[45] Date of Patent: May 22, 1990

[54] LASER POWER CONTROL SYSTEM

[75] Inventor: Douglas H. Burns, Santa Clara, Calif.

[73] Assignee: Lasa Industries, Inc., San Jose, Calif.

[21] Appl. No.: 368,609

[22] Filed: Jun. 20, 1989

Related U.S. Application Data

[63] Continuation-in-part of Ser. No. 251,585, Sep. 28, 1988, abandoned.

[51] Int. Cl.[5] .............................................. H01S 3/13
[52] U.S. Cl. ....................................... 372/31; 372/13; 372/33; 372/26
[58] Field of Search ....................... 372/31, 13, 29, 28, 372/26, 33

[56] References Cited

U.S. PATENT DOCUMENTS

| | | | |
|---|---|---|---|
| 4,105,953 | 8/1978 | Jernigan | 372/13 |
| 4,586,184 | 4/1986 | Hess | 372/13 |
| 4,665,524 | 5/1987 | Cotter | 372/13 |
| 4,672,192 | 6/1989 | Muka et al. | 372/31 |

*Primary Examiner*—Léon Scott, Jr.
*Attorney, Agent, or Firm*—Cushman, Darby & Cushman

[57] ABSTRACT

A laser power beam control system includes a photodetector for generating an electrical signal which is proportional to the power level of the laser beam. The electrical signal is converted to a high frequency modulated signal which controls a single acousto-optical modulator. The acousto-optical modulator is in the laser beam path and controls the power level of the beam in response to the amplitude modulated signal. The system is particularly adapted to control a laser beam used in raster or vector scanning a laser for the formation of semiconductor integrated circuits.

14 Claims, 3 Drawing Sheets

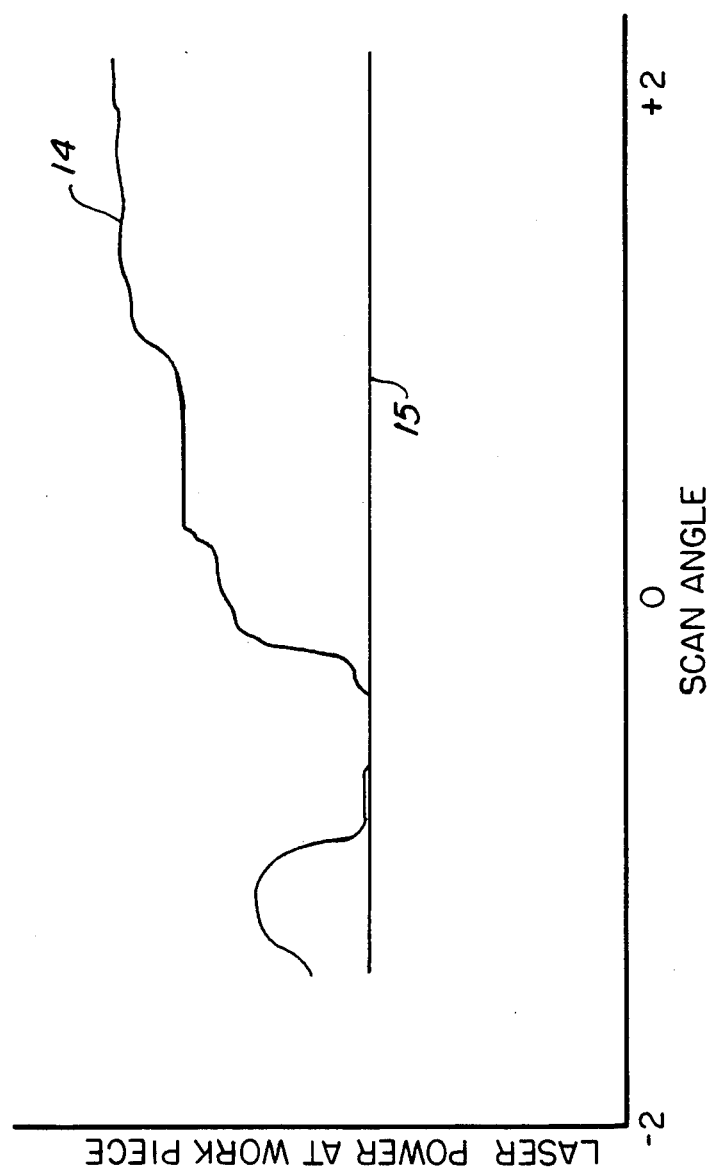

LASER POWER CONTROL SYSTEM

BACKGROUND OF THE INVENTION

This is a continuation-in-part of application Ser. No. 07/251,585, filed Sept. 28, 1988 now abandoned.

The invention relates to an improved method of controlling the light power of a laser beam used in a materials processing machine.

Manufacturing and materials processing machines that use lasers for their source of processing energy have had little need for extreme accuracy in controlling the beam power. In some laser welding machines, for example, the beam is positioned by mechanical mirror arrangements and the only variation in beam power is that caused by optical attenuation in the lens system. This optically caused beam variation is a smooth and readily calculated variation and, therefore, can be easily compensated. Other welding and cutting machines using lasers position the beam by moving the work piece or the laser by mechanical means and do not employ scanning. These latter types of machine have no laser power variation since the optical system is fixed in relation to the laser.

In more modern machines using lasers, scanning is effected by means of acoustically driven optical scanners. This type of scanner is necessary to achieve the speeds required for the processes to be economical. Acousto-optical scanners have transmission efficiencies that are a function of the scan angle. The variation in efficiency as the scan angle is changed results in a laser power variation with position. Many processes using lasers cannot tolerate a variation in laser power of greater than a few percent. The variation in laser beam power caused by scanner efficiency variations can be as large as 50 percent which is more than most processes can tolerate.

One method of compensating for scanner variation is to shape the radio frequency drive signal coupled to the scanner as a function of frequency in such a manner as to cause the drive signal to be greater at frequencies where the scanner is inefficient and to be lower at frequencies where the scanner is more efficient. In this manner, some partial compensation for scanner variation can be achieved. However, the number of compensation points required on such an equalizer is very great if the accuracy required by most laser processes is to be met. A practical 16 point equalizer can typically reduce the scanner variation to about 15 percent over the scan field.

A method for reducing noise in a laser light apparatus is disclosed in U.S. Pat. No. 4,672,192 to Muka et al., whose teachings are incorporated by reference. Disclosed in Muka et al. is the use of a plurality of acousto-optical modulators to control the AC and DC component signals of a laser light beam. A first acousto-optical modulator is used to condition the laser beam to a constant intensity. The conditioned beam is passed to a second modulator where video information is applied to the laser beam via a X-Y deflector. Correction for beam intensity is performed before the laser passes through the X-Y deflector which is itself a source of beam intensity variations. Muka et al. employs the zero order laser beam to measure the DC and AC components of the laser beam.

There is a need in the art for a simple and more effective method of controlling and modulating a laser beam. It is desirable that such a method be automatic and achieve a beam power variation of less than five percent over the scan field.

SHORT STATEMENT OF THE INVENTION

The present invention is an improved method of controlling laser beam power in manufacturing equipment used for the manufacture of, among other things, semiconductor devices. In accordance with the invention, after scanning of the laser beam has been effected, a portion of the laser beam is detected by a large area photocell. The laser beam is masked in such a manner that only the desired first order diffraction beam impinges on the photocell. The output of the photocell is amplified and used to control an acoustically driven optical modulator located in the laser beam path between the laser beam generator and the scanning deflector. The control causes the laser beam power to be reduced when the laser beam power to the work piece, and hence to the photocell, is larger than some predetermined level. In this manner the scanning beam power can be held to less than one percent variation over the scan field.

It is an object of this invention to control the intensity of a laser light beam to a constant level as the beam is scanned on a workpiece.

The present invention features a single acousto-optical modulator for writing in raster or vector scan a laser beam at near constant intensity on a workpiece.

It is an advantage of this invention that the overall power available to be delivered to the worked surface is increased by use of fewer system components.

BRIEF DESCRIPTION OF THE DRAWINGS

Other improvements, advantages and features of the present invention will become more fully apparent from the following detailed description of the preferred embodiment, the appended claims and the accompanying drawings in which:

FIG. 3 is a plot of a typical power variation versus scan angle for an acousto-optical deflector and a plot of the power variation versus scan angle when using the teachings of this invention.

DETAILED DESCRIPTION OF THE PREFERRED EMBODIMENT

Figure 1:
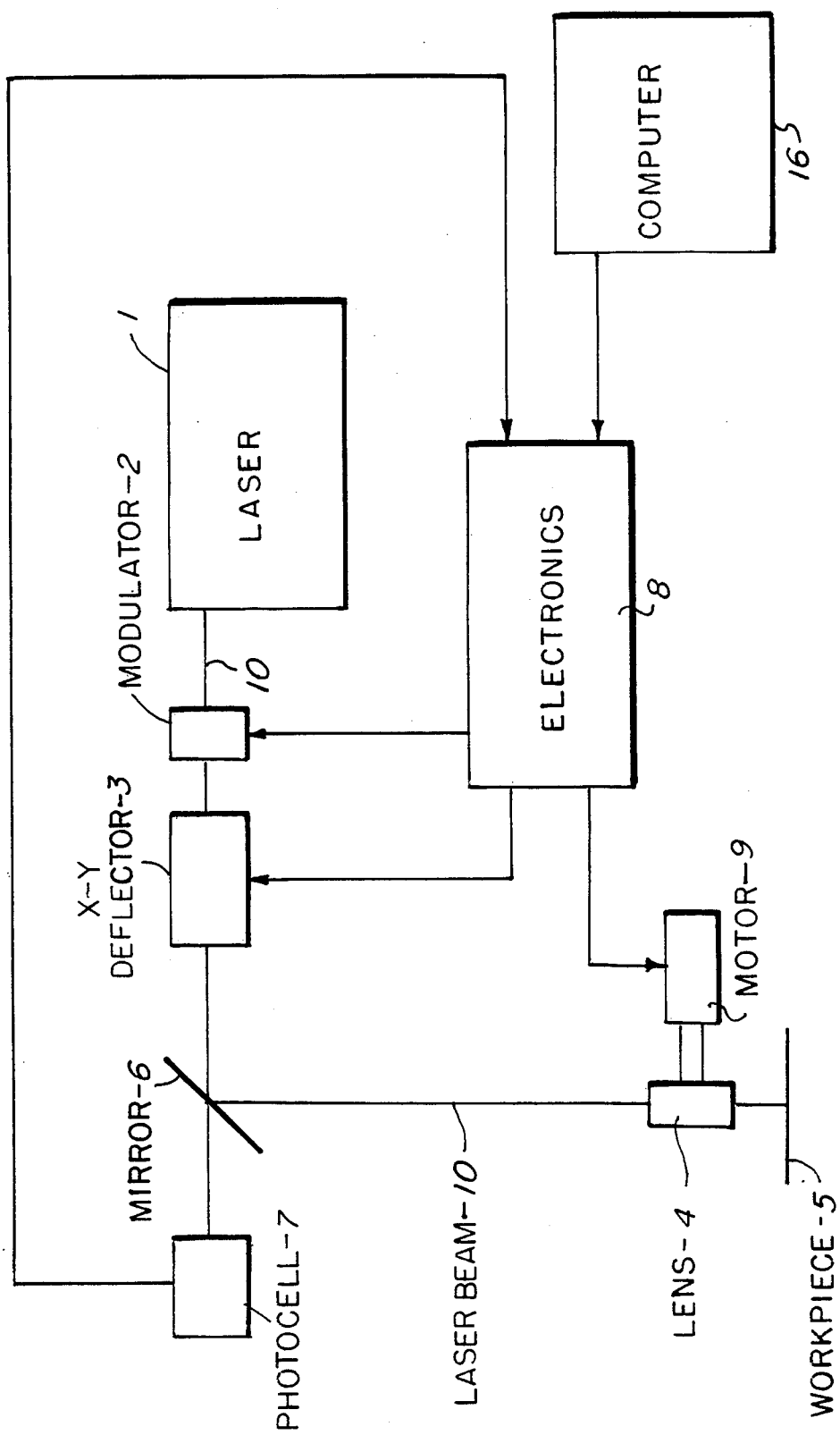
FIG. 1 is a schematic representation of one form of a laser power control arrangement according to the preferred embodiment of the present invention.

Referring now to FIG. 1 which, by way of example, illustrates the preferred embodiment of the present invention. It should be appreciated that the laser power control scheme, according to the invention, can be used with any substrate or work surface or process desired for fabricating the device being manufactured. A light beam appropriate for the system and material to be processed is provided by a laser 1. A laser beam 10 is directed from the laser 1 through a modulator 2, an X-Y deflector 3, and an objective focusing lens 4 onto the work surface 5 by means of a beam splitting mirror 6. The beam splitting mirror 6 may, for example, reflect 97 percent of the impinging beam and transmit 3 percent of the beam. Therefore, a small percentage of the laser beam passes through the mirror 6 and impinges on the photodetector 7. The photodetector is of conventional design and preferably is a large area photocell. Most of the energy of the beam is reflected by the mirror 6 through the objective lens 4 and onto the work piece 5. Beam focus is controlled by the position of the objective lens 4 which is positioned by motor 9 in a manner well known in the art. The positioning motor 9 is driven by signals from the electronic control system 8.

The electrical output of the photocell 7 is fed to the electronic control system 8. Here the feedback obtained from the photocell 7 is combined with the video information signal supplied by computer 16. In the electronics module, the video signal is subtracted from the feedback signal generated from the laser power control photocell in such a manner that the acousto-optical modulator tries to reduce this feedback error signal to a zero level as is usual in a servo system. The signal exiting from the electronics module and going to the modulator is electronically conditioned so as to drive the modulator in the proper direction to cause the error signal to approach zero. An output of the electronic control system 8 is a signal that is fed to the modulator 2.

In the preferred embodiment, the modulator 2 is an acoustical optical modulator of a type conventionally known in the art. It should be appreciated that the signal driving the modulator 2 is a high frequency sine wave whose frequency is being controlled by the feedback signal from the photocell 7. The variation in frequency causes more or less of the laser beam to pass through the modulator. The acousto-optical modulator controls the intensity of laser beam by diffracting a portion of the beam. The diffracted light does not reach the workpiece. Therefore, the total laser light beam reaching the workpiece is attenuated.

The signal that is fed to the modulator 2 is such that when the light power falling on the photocell 7 exceeds some predetermined level, the modulator 2 reduces the amount of light that it passes. The amount of reduction of the light power depends on the feedback gain of the system and may be varied depending on stability considerations.

FIG. 3 is a plot that shows a typical variation of laser power at the work piece versus scan angle. The scanning is produced by the X-Y deflector 3 in FIG. 1. Without the power control system of the parent invention, the variation of laser power is represented by the plot 14 in FIG. 3. However, when the control system is used, plot 15 represents laser power versus scan angle. As can be seen from the plot the improvement can be very great. It is desirable that the feedback signal from the photocell 7 be taken from the X-Y deflector which is a significant source of beam variation.

Figure 2:
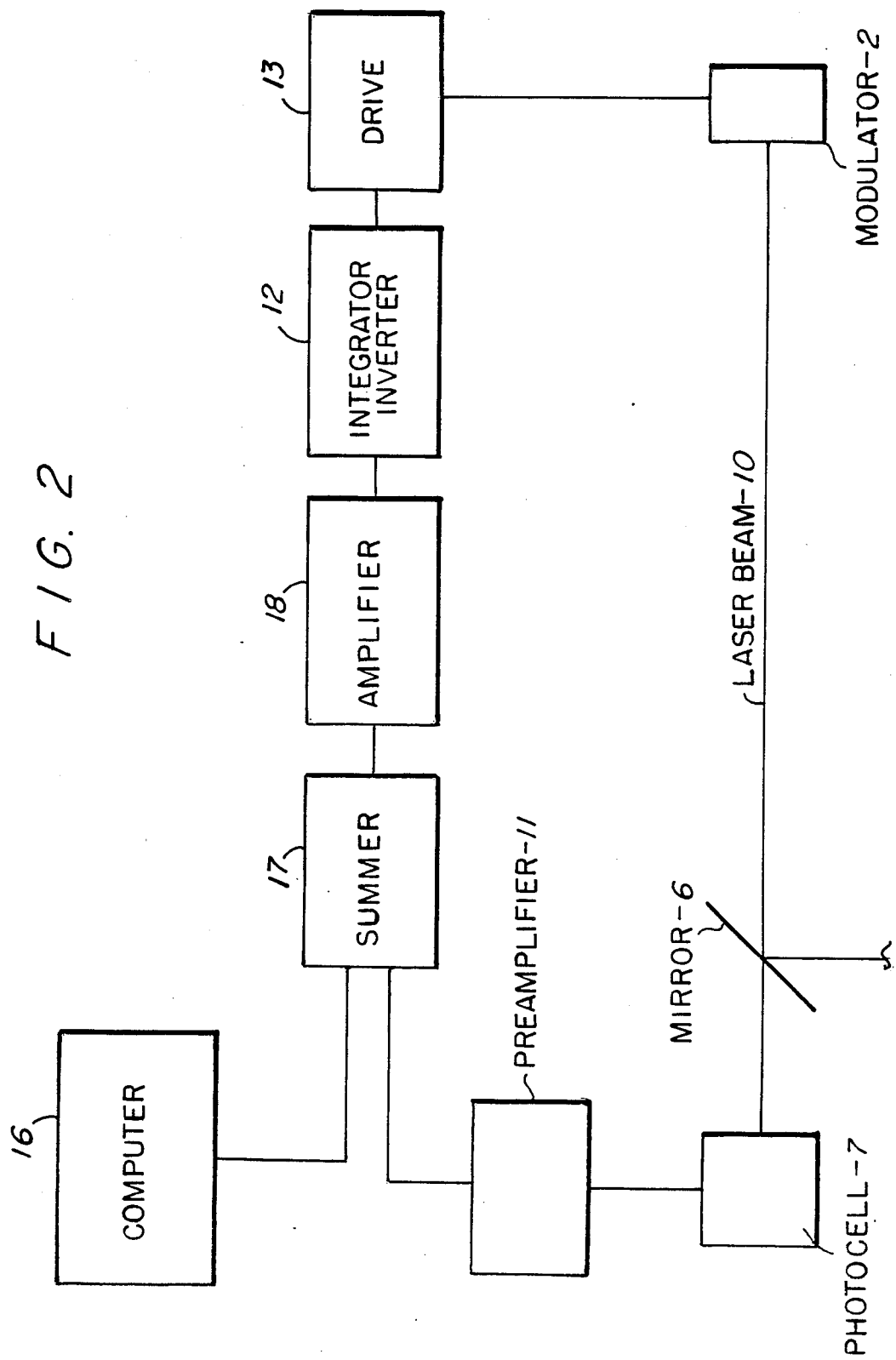
FIG. 2 illustrates a block diagram of the electronic processing circuitry of the preferred embodiment.

The details of the electronic control system are illustrated in FIG. 2. As shown in this figure, the electrical signal output from the photocell 7 is fed to an preamplifier 11 to appropriately condition the signal to proper voltage levels. The amplified signal is summed with the video information signal from the control computer 16 in a summing circuit 17. The summing circuit 17 outputs an error signal which is amplified by an amplifier 18. The output of the amplifier 18 is then integrated by an integrator-invertor 12 and fed to a driver amplifier 13. In driver amplifier 13 the electrical signal from the integrator-invertor is used to an amplitude modulate an oscillator whose output is amplified and fed to the acousto-optical modulator 2. The modulator 2 controls the amount of laser light that passes in the main beam by deflecting more or less of the laser beam into higher orders of the diffracted beam. In this manner the amount of power that is reflected by mirror 6 down through the objective lens onto the work piece is controlled as has been previously explained.

It should be clear that the circuit shown by way of illustration in FIG. 2 can also include a digital computer to perform the functions of integration and inversion. In this case, the output of the amplifier 18 would be fed to an analog-to-digital converter and then to the computer where the integration and inversion functions can be performed. The computer output would then be fed through a digital-to-analog converter to the driver 13 and then to the optical modulator 2.

It is preferable that the diffracted (first order) laser beam be used in the present invention because it has a wider dynamic range than the undiffracted (zero order) laser beam. The efficiency of acousto-optical modulators is generally about 85 percent, therefore a residual amount of power always passes through as the zero order beam. That is, 15 percent of the beam always passes through as the zero order since a maximum of 85 percent of the power can be deflected into higher (diffracted) orders. In the present invention it is the first order (diffracted) beam that is monitored by the photocell. The first order laser beam monitored by the photocell can range from zero to some high value. The capability of going to zero is desireable for laser writing because the video signal supplied by computer 16 generally goes from fully off to fully on.

While the preferred embodiment has been disclosed in connection with the preferred embodiment thereof, it should be appreciated that other embodiments may be utilized in keeping with the spirit and scope of the present invention as defined by the appended claims.

What is claimed is:

1. A method of precisely controlling the power of a laser beam comprising the steps of:
   impinging a portion of a laser beam exiting an x-y deflector onto a photodetector, the photodetector generating an electrical feedback signal related to the power of said impinging laser beam exiting said x-y deflector;
   combining said electrical feedback signal with a video information signal in a servo feedback loop including said x-y deflector and a single acousto-optical modulator to produce an acousto-optical modulator control error signal; and
   supplying the modulator control error signal to said single acousto-optical modulator;
   said control signal controlling said single acousto-optical modulator to reduce the error signal produced in the servo feedback loop to substantially zero thereby adjusting the power level of the laser beam to a predetermined level.

2. The method of claim 1 wherein said converting step includes the steps of amplifying the output signal of said photodetector, summing the amplified photodetector output signal with the video information signal, amplifying the summed signal, integrating said amplified summed signal, and inverting the integrated signal.

3. The method of claim 2 wherein a computer is used for integrating and inverting the signal.

4. A method of precisely controlling the power of a laser beam on a workpiece comprising the steps of:
   selecting a portion of the first order diffraction effects from the laser beam;
   impinging said first order diffraction effects of the laser beam onto a photodetector, the photodetector having an electrical output;

combining the electrical output of said photodetector with a video information signal in a servo feedback loop including deflector means to produce an electrical control signal for controlling a single acousto-optical modulator;

supplying said electrical control signal to an electric driver disposed on said single acousto-optical modulator;

the output of said driver controlling said single acousto-optical modulator thereby adjusting the power level of the laser beam at the workpiece to a predetermined level.

5. The method of claim 4 wherein the step of combining of the electrical output signal from the photodetector with the video information signal includes amplifying, summing, integrating, and inverting the signal.

6. The method of claim 5 wherein a computer is used for integrating and inverting the signal.

7. A laser beam power control system comprising:
a laser beam source having its beam directed toward a workpiece;
directing means for conveying a portion of said laser beam onto a photodetector; a servo feedback loop comprising: a single acousto-optical modulator, an x-y deflector, and said photodetector; said photodetector generating electrical signals to an electronic control system; said electronic control system controlling said x-y deflector and said modulator such that the portion of the laser beam impinging on said photodetector is attentuated to a predetermined level thereby controlling the power of said laser beam on said workpiece.

8. The laser beam power control system of claim 9 wherein said photodetector is a large area photocell, and said directing means conveys a first order diffraction portion of said laser beam onto said photocell.

9. The laser beam power control system of claim 8 wherein said single acousto-optical modulator limits the amount of first order diffraction of said laser beam to pass therethrough.

10. The laser beam control system of claim 9 wherein said means for generating electrical signals further includes a high frequency oscillator and means responsive to said photocell for modulating said output of said high frequency oscillator; said modulated high frequency signal being coupled to said acousto-optical modulator.

11. The laser beam control system of claim 10 wherein said modulated high frequency signal is amplitude modulated and wherein the amplitude thereof is inversely proportional to the power level of said laser beam impinging upon said photocell.

12. The laser beam control system of claim 11 wherein said means for directing a predetermined portion of said laser beam onto said photocell comprises a beam splitter and further comprising a focus lens for focusing said laser beam onto a work piece.

13. A laser beam power control system comprising:
a laser beam source having its beam directed toward a workpiece;
directing means for conveying a portion of said laser beam onto a photodetector; a servo feedback loop comprising: a single acousto-optical modulator, an x-y deflector, and said photodetector; said photodetector generating electrical signals to an electronic control system; said electronic control system combining a video information signal and said electrical signals produced by said photodetector; said electronic control system controlling said x-y deflector and said modulator such that the portion of the laser beam impinging on said photodetector is attenuated to a predetermined level thereby controlling the power of said laser beam on said workpiece.

14. The laser beam power control system of claim 13 wherein said electronic control system includes a summing circuit, amplifying circuit, integrating circuit and inverting circuit.

* * * * *